(12) United States Patent
Lin

(10) Patent No.: US 9,787,189 B1
(45) Date of Patent: Oct. 10, 2017

(54) MULTIPHASE DC POWER SUPPLY WITH HIGH SWITCHING FREQUENCY

(71) Applicant: CHYNG HONG ELECTRONIC CO., LTD., Taichung (TW)

(72) Inventor: Mu-Chun Lin, Taichung (TW)

(73) Assignee: CHYNG HONG ELECTRONIC CO., LTD., Taichung (TW)

( * ) Notice: Subject to any disclaimer, the term of this patent is extended or adjusted under 35 U.S.C. 154(b) by 0 days.

(21) Appl. No.: 15/094,491

(22) Filed: Apr. 8, 2016

(51) Int. Cl.
*H02J 1/10* (2006.01)
*H02M 3/28* (2006.01)
*H02M 7/217* (2006.01)
*H02M 1/42* (2007.01)

(52) U.S. Cl.
CPC ......... *H02M 3/285* (2013.01); *H02M 1/4225* (2013.01); *H02M 7/217* (2013.01)

(58) Field of Classification Search
CPC ............. H02M 3/1582; H02M 3/1584; H02M 2003/1586; H02M 1/045; H02M 7/006; H02M 7/153; H02M 7/19; H02M 1/4208; H02M 1/081; H02M 3/33592; H02M 3/33569; H02M 3/335
USPC ................................ 363/65–67, 89, 125, 127
See application file for complete search history.

(56) References Cited

U.S. PATENT DOCUMENTS

| | | | | |
|---|---|---|---|---|
| 6,172,888 B1* | 1/2001 | Jochi | ................... | B23K 11/258 363/89 |
| 2008/0278969 A1* | 11/2008 | Bolz | ................... | H02J 7/0014 363/17 |
| 2011/0074486 A1* | 3/2011 | Hou | ................... | H03F 1/0244 327/333 |

* cited by examiner

*Primary Examiner* — Nguyen Tran
(74) *Attorney, Agent, or Firm* — Ming Chow; Sinorica, LLC

(57) ABSTRACT

A multiphase DC power supply with high switching frequency of 1 MHz comprising three parallel connected three phase DC power supply. Each of the d parallel connected three phase DC power supply comprises a boost power factor corrector to convert an AC power source to a rectified and filtered DC voltage, an isolation transformer connected to the boost power factor corrector to generate a full wave rectified DC voltage having stable voltage level, a duck switching circuit consisting of a first, a second and a third semiconductor switches to regulate the voltage level of the output of said isolation transformer and a phase controller to manage an interleaved phase of the output of said three semiconductor switches. The multiphase DC power supply uses interleaved power factor correction technology to successfully provide a DC power supply with high switching frequency, low ripple noise and not subject to EMI.

6 Claims, 1 Drawing Sheet

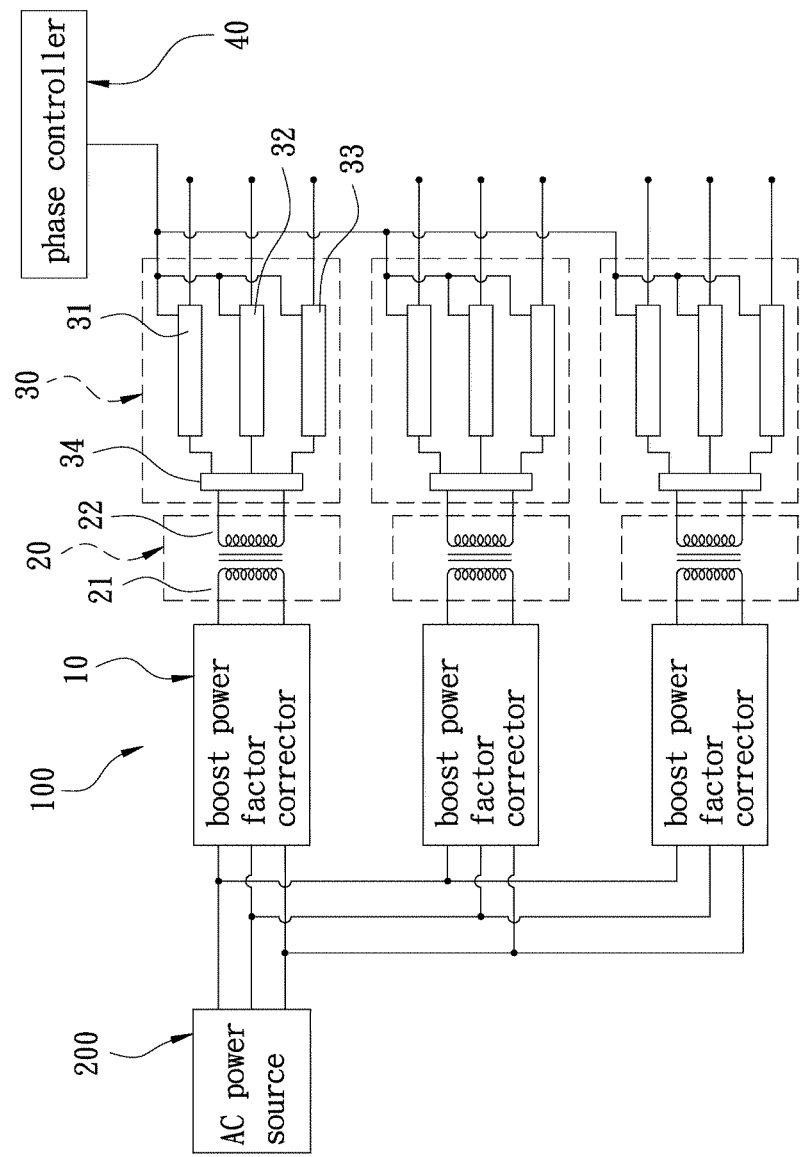

MULTIPHASE DC POWER SUPPLY WITH HIGH SWITCHING FREQUENCY

BACKGROUND OF THE INVENTION

Field of the Invention

The present invention relates to a DC power supply, particularly relates to a multiphase DC power supply with high switching frequency.

Brief Description of the Prior Art

Modern electronics industry adopts the necessity of DC power supply for the electronic devices. Since the data transmission speed has been increasing to a great extent, the switching frequency of a DC power supply used will also be needed to operate with a high switching frequency. The output current wave form will be smooth if the switching frequency is high enough. The responsive speed will be faster and ripple noise will be lowered. Considering a notebook PC, the CPU usually have an operation frequency up to several mega Hertz. A DC power supply with high switching frequency is definitely needed.

SUMMARY OF THE INVENTION

It is therefore the principle object of the present invention is to provide a multiphase DC power supply with high switching frequency which adopts interleaved technology to generate DC power with switching frequency of 1 MHz.

The advantages of the multiphase DC power supply with high switching frequency according to the present invention are fast responsive speed and low ripple noise.

Another advantage of the multiphase DC power supply with high switching frequency according to the present invention is the overall power supply meets the EMI requirement.

The important and main feature of the multiphase DC power supply with high switching frequency according to the present invention is to adopt three sets of duck switching circuit each contains a first, a second and a third semiconductor switches parallel connected and each have an output of power with 110 KHz to 150 KHz.

Another feature of the multiphase DC power supply with high switching frequency according to the present invention is to adopt an interleaved power phase controller to manage the output of the semiconductor switches for a sum of 1 MHz.

It is therefore the multiphase DC power supply with high switching frequency according to the present invention comprises three parallel connected three phase DC power supply, a boost power factor corrector to convert the AC power source to a rectified and filtered DC voltage, an isolation transformer connected to the boost power factor corrector to generate a full wave rectified DC voltage having stable voltage level, a duck switching circuit consists three semiconductor switches to regulate the voltage level of the output of the isolation transformer and each generate an output of switching frequency between 110 KHz and 150 KHz, and a phase controller to manage an interleaved phase of the output of the three semiconductor switches.

BRIEF DESCRIPTION OF THE DRAWINGS

Other objectives, advantages and features of the multiphase DC power supply with high switching frequency will become apparent from the below detailed description of the preferred embodiment with reference to the accompanying drawings, wherein:

FIG. 1 is a functional block diagram of the embodiment of a multiphase DC power supply with high switching frequency according to the present invention.

DETAILED DESCRIPTION OF THE PREFERRED EMBODIMENT

Referring to FIG. 1 which shows a functional block diagram of an embodiment of a multiphase DC power supply with high switching frequency according to the present invention, the DC power supply comprises three parallel connected three phase DC power supply 100.

Each three phase DC power supply 100 contains a boost power factor corrector 10 to convert the AC power from the AC power source 200 to a higher voltage, rectified and filtered DC power.

An isolation transformer 20 comprises a primary winding side 21 connected to the boost power factor corrector 10 and a secondary winding side 22 to regulate the voltage level of the boost power factor corrector 10 and generate a full wave rectified DC voltage.

A duck switching circuit 30 electrically connected to the secondary side 22 of the isolation transformer 20, comprises a rectifier filter circuit 34 to regulate the voltage level output from the isolation transformer. The duck switching circuit 30 comprises a first semiconductor switch 31, a second semiconductor switch 32 and a third semiconductor switch 33 parallel connected with one another. These first, second and third switches are commercially available for certain MOSFET (Metal-Oxide-Semiconductor Field Effect Transistor) such as UCC28070. The output frequency of these three semiconductor switches is between 110 KHz and 150 KHz. In a preferred embodiment, the output switching frequency is set as 112 KHz.

A phase controller 40 is electrically connected to the three semiconductor switches 31, 32 and 33 to manage and result an interleaved power factor correction. It is to be noted, as in a preferred embodiment with those nine semiconductor switches having an output switching frequency of 112 KHz, the resulted overall multiphase switching frequency of the DC power supply shall be 1008 KHz.

The multiphase DC power supply with high switching frequency according to the present invention as described above uses semiconductor switches to operate at its own switching frequency independently with one another. During usage of the DC power supply, the ripple noise of each semiconductor switch seems to be added to a sum. However, it is noted and found that, with technology of interleaved power factor correction, the ripple noise of different phase in different semiconductor switch will mutually offset resulted a low ripple noise. Also, since the semiconductor switches are operating in a relative low switching frequency such as 110 to 150 KHz, the switching speed will be fast and there will be no EMI effect.

Although the multiphase DC power supply with high switching frequency according to the present invention has been described hereinabove, it is to be noted that other changes, modifications and improvements can still be made without departing from the spirit of the invention and shall be fallen in the protection scope as specified in the appended claims.

What is claimed is:

1. A multiphase DC power supply with high switching frequency comprising three parallel connected three phase DC power supply characterized in each of said parallel connected three phase DC power supply comprises:

a boost power factor corrector to convert an AC power source to a rectified and a filtered DC voltage;

an isolation transformer connected to the boost power factor corrector to generate a full wave rectified DC voltage having a stable voltage level;

a duck switching circuit consisting a first, a second and a third semiconductor switches to regulate the voltage level of an output of said isolation transformer and each generate an output of switching frequency between 110 KHz and 150 KHz; and a phase controller to manage an interleaved phase of the output of said three semiconductor switches.

2. A multiphase DC power supply with high switching frequency as claimed in claim 1 wherein said duck switching circuit further comprises a rectifier filter circuit.

3. A multiphase DC power supply with high switching frequency as claimed in claim 2 wherein said isolation transformer comprises a primary winding connected to said boost power factor corrector and a secondary winding connected to said rectifier filter circuit to regulate the voltage level of the boost power factor corrector and generate the full wave rectified DC voltage.

4. A multiphase DC power supply with high switching frequency as claimed in claim 1 wherein said semiconductor switches are MOSFET (Metal-Oxide-Semiconductor Field Effect Transistor).

5. A multiphase DC power supply with high switching frequency as claimed in claim 1 wherein said first, second and third semiconductor switches each generate the output of switching frequency 112 KHz.

6. A multiphase DC power supply with high switching frequency as claimed in claim 5 wherein the high switching frequency of said multiphase DC power supply being 1 MHz.

* * * * *